US012567596B2

(12) United States Patent
Akabori et al.

(10) Patent No.: US 12,567,596 B2
(45) Date of Patent: Mar. 3, 2026

(54) FUEL CELL SYSTEM

(71) Applicant: HONDA MOTOR CO., LTD., Tokyo (JP)

(72) Inventors: Sho Akabori, Wako (JP); Shuto Maniwa, Wako (JP); Tomoyuki Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 526 days.

(21) Appl. No.: 18/127,112

(22) Filed: Mar. 28, 2023

(65) Prior Publication Data

US 2023/0317987 A1    Oct. 5, 2023

(30) Foreign Application Priority Data

Mar. 31, 2022    (JP) .............................. JP2022-057956

(51) Int. Cl.
*H01M 8/04302* (2016.01)
*H01M 8/0258* (2016.01)
*H01M 8/22* (2006.01)

(52) U.S. Cl.
CPC ..... *H01M 8/04302* (2016.02); *H01M 8/0258* (2013.01); *H01M 8/22* (2013.01)

(58) Field of Classification Search
CPC .. H01M 8/04302; H01M 8/0258; H01M 8/22; H01M 8/04; H01M 8/0662; H01M 8/2465
See application file for complete search history.

(56) References Cited

U.S. PATENT DOCUMENTS

| | | | | |
|---|---|---|---|---|
| 2012/0308908 A1* | 12/2012 | Katano | ............. | H01M 8/04776 |
| | | | | 429/429 |
| 2015/0162629 A1 | 6/2015 | Tomita et al. | | |
| 2018/0069249 A1* | 3/2018 | Yoshioka | .............. | F16K 31/041 |
| 2019/0372139 A1* | 12/2019 | Yoshioka | .......... | H01M 8/04104 |

FOREIGN PATENT DOCUMENTS

| | | |
|---|---|---|
| JP | 2003-208911 A | 7/2003 |
| JP | 2004-172027 A | 6/2004 |
| JP | 2015-115227 A | 6/2015 |
| WO | 2013/187514 A1 | 12/2013 |

OTHER PUBLICATIONS

Office Action dated Oct. 31, 2023 issued over the corresponding Japanese Patent Application No. 2022-057956 with the English machine translation thereof.

* cited by examiner

*Primary Examiner* — Stewart A Fraser
(74) *Attorney, Agent, or Firm* — Carrier, Shende & Associates, P.C.; Fulchand P. Shende; Joseph P. Carrier

(57) ABSTRACT
During startup of a fuel cell system, a control device adjusts opening degrees of a bypass valve, an inlet side stop valve, and an outlet side stop valve in a manner that the flow rate of an oxygen-containing gas in a bypass channel supplied from an oxygen-containing gas supply apparatus becomes larger than the flow rate in an oxygen-containing gas supply channel and an oxygen-containing off gas discharge channel. In this manner, during startup of the fuel cell system, while diluting concentration of a fuel gas remaining at a cathode of the fuel cell stack, the fuel gas is discharged to the outside in a short period of time.

8 Claims, 6 Drawing Sheets

FIG. 3

FUEL CELL SYSTEM

CROSS-REFERENCE TO RELATED APPLICATIONS

This application is based upon and claims the benefit of priority from Japanese Patent Application No. 2022-057956 filed on Mar. 31, 2022, the contents of which are incorporated herein by reference.

BACKGROUND OF THE INVENTION

Field of the Invention

The present invention relates to a fuel cell system for performing power generation by electrochemical reactions of a fuel gas and an oxygen-containing gas.

Description of the Related Art

In recent years, research and development have been carried out on fuel cells (FC) that contribute to energy efficiency in order to ensure that more people have access to affordable, reliable, sustainable and modern energy.

For example, JP 2004-172027 A, discloses a fuel cell system for preventing a fuel gas remaining at an anode when the fuel cell system is stopped from being diffused to a cathode through an electrolyte membrane, and preventing the fuel gas having high concentration from being released to the atmospheric air from an exhaust pipe at the cathode during startup of the fuel cell system.

In this fuel cell system, during the startup, operation of a pump is controlled in a manner that the flow rate of the pump for supplying an oxygen-containing gas to the fuel cell stack is reduced to suppress increase of the concentration of the fuel gas released from the exhaust gas pipe at the cathode.

SUMMARY OF THE INVENTION

However, during the startup of the fuel cell system, when the flow rate of the pump for supplying the oxygen-containing gas is reduced, the time required for discharging the fuel gas from the exhaust gas pipe at the cathode becomes long during the startup. An object of the present invention is to solve the above problem.

A fuel cell system according to an aspect of the present invention includes a fuel cell stack configured to perform power generation by a fuel gas and an oxygen-containing gas, an oxygen-containing gas supply apparatus configured to supply the oxygen-containing gas to the fuel cell stack through an oxygen-containing gas supply channel, an oxygen-containing off gas discharge channel configured to discharge an oxygen-containing off gas used in the power generation from the fuel cell stack, a bypass channel configured to connect the oxygen-containing gas supply channel and the oxygen-containing off gas discharge channel, an inlet side stop valve configured to adjust the flow rate in the oxygen-containing gas supply channel, an outlet side stop valve configured to adjust the flow rate in the oxygen-containing off gas discharge channel, a bypass valve configured to adjust the flow rate in the bypass channel, and a control device configured to adjust opening degrees of the inlet side stop valve, the outlet side stop valve, and the bypass valve. The control device is configured to, during startup of the fuel cell system, adjust opening degrees of the bypass valve, the inlet side stop valve, and the outlet side stop valve in a manner that the flow rate of the oxygen-containing gas in the bypass channel supplied from the oxygen-containing gas supply apparatus becomes larger than the flow rate in the oxygen-containing gas supply channel and the flow rate in the oxygen-containing off gas discharge channel.

In the present invention, during startup of the fuel cell system, the opening degrees of the bypass valve, the inlet side stop valve, and the outlet side stop valve are adjusted in a manner that the flow rate of the oxygen-containing gas in the bypass channel becomes larger than the flow rate in the oxygen-containing gas supply channel and the oxygen-containing off gas discharge channel. Therefore, during the startup of the fuel cell system, while diluting concentration of the fuel gas remaining at the cathode of the fuel cell stack, it is possible to discharge the fuel gas to the outside in a short period of time.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a diagram used for explaining a flow rate ratio during concentration dilution and discharge of a fuel gas remaining at a cathode of the fuel cell stack during startup;

DETAILED DESCRIPTION OF THE INVENTION

Embodiments

[Structure]

Figure 1:
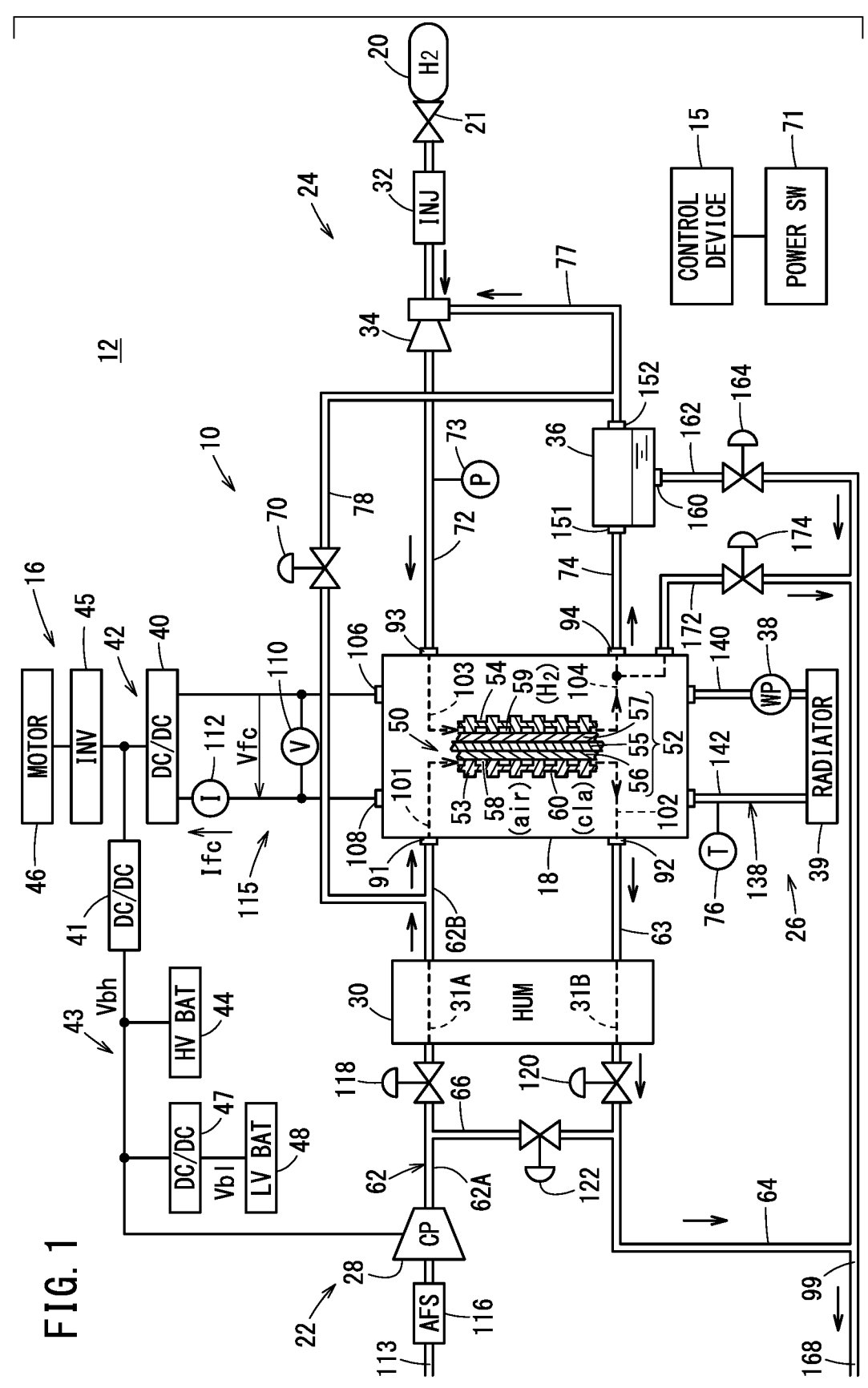
FIG. 1 is a structural diagram schematically showing a fuel cell vehicle including a fuel cell system according to an embodiment of the present invention.

FIG. 1 is a structural diagram schematically showing a fuel cell vehicle 12 including a fuel cell system 10 according to an embodiment of the present invention.

The fuel cell system 10 can be incorporated into other movable elements such as ships, airplanes, robots other than the fuel cell vehicle 12.

The fuel cell vehicle 12 includes a control device 15 for controlling the entire fuel cell vehicle 12, the fuel cell system 10, and an output unit 16 electrically connected to the fuel cell system 10.

The control device 15 may not be just one control device. Two or more control devices, e.g., for the fuel cell system 10 and for the output unit 16 may be provided.

The fuel cell system 10 includes a fuel cell stack (hereinafter also simply referred to as the fuel cell) 18, a hydrogen tank (fuel gas tank) 20, an oxygen-containing gas supply apparatus 22, a fuel gas supply apparatus 24, and a coolant supply apparatus 26.

The oxygen-containing gas supply apparatus 22 includes a compressor (CP) 28 and a humidifier (HUM) 30.

The fuel gas supply apparatus 24 includes an injector (INJ) 32, an ejector 34, and a gas liquid separator 36. The injector 32 may be replaced with a pressure reducing valve. The coolant supply apparatus 26 includes a coolant pump (WP) 38 and a radiator 39. The output unit 16 includes a voltage converter 42, an energy storage 43, and a motor (electric motor) 46.

The voltage converter 42 includes an inverter 45, a DC-DC converter (SUC) 40 as a step-up converter, and a DC-DC converter (SUDC) 41 as a step-up/step-down converter.

The energy storage 43 includes a high voltage energy storage device (battery, HV BAT) 44, a DC-DC converter (SDC) 47 as a step-down converter, and a low voltage energy storage device (low voltage battery, LV BAT) 48.

Loads of the voltage converter 42 connected to the fuel cell stack 18 and the energy storage 43 including the high voltage energy storage device 44 include the motor 46, the compressor 28, and low voltage auxiliary devices. The motor 46 is a main device. The compressor 28 is a high voltage auxiliary device which receives electric power from the high voltage energy storage device 44. The low voltage auxiliary devices which receive electric power from the low voltage energy storage device 48 include, for example, an air conditioner (not shown) and various sensors, various solenoid valves, the injector 32, and the coolant pump 38.

The DC-DC converter 40 performs step-up conversion of the power generation voltage Vfc (DC voltage), and applies the stepped up power generation voltage Vfc to the DC end of the inverter 45 and the DC-DC converter 41 as a driving high voltage.

The DC-DC converter 41 performs step-down conversion of the driving high voltage to the battery voltage Vbh of the high voltage energy storage device 44 to charge the high voltage energy storage device 44.

The DC-DC converter 47 steps downs the high voltage battery voltage Vbh to the low voltage battery voltage Vbl to charge the low voltage energy storage device 48.

The high voltage which has been obtained by step-up conversion of the battery voltage Vbh by the DC-DC converter 41 and/or the high voltage which has been obtained by step-up conversion of the power generation voltage Vfc by the DC-DC converter 40 are applied to the DC end of the inverter 45.

The inverter 45 converts the DC high voltage into a three phase alternating current, and generates a driving force by the motor 46. Further, the inverter 45 converts the regenerative voltage of the motor 46 into the DC high voltage. The DC high voltage is converted into lower voltage by the DC-DC converter 41, and applied to the high voltage energy storage device 44 to charge the high voltage energy storage device 44. The fuel cell vehicle 12 travels by the drive force generated by the motor 46.

The fuel cell stack 18 is formed by stacking a plurality of power generation cells 50. Each of the power generation cells 50 includes a membrane electrode assembly 52 and separators 53, 54 sandwiching the membrane electrode assembly 52.

For example, the membrane electrode assembly 52 includes a solid polymer electrolyte membrane 55, and a cathode 56 and an anode 57 on both sides of the solid polymer electrolyte membrane 55. The solid polymer electrolyte membrane 55 is a thin membrane of perfluorosulfonic acid impregnated with water.

Each of the cathode 56 and the anode 57 has a gas diffusion layer (not shown) such as a carbon paper. Porous carbon particles on which platinum alloy is supported are deposited uniformly on the surface of the gas diffusion layer, and thereby electrode catalyst layers (not shown) are formed. The electrode catalyst layers are formed on both surfaces of the solid polymer electrolyte membrane 55.

A cathode flow field (oxygen-containing gas flow field) 58 is formed on a surface of one of the separators 53 facing the membrane electrode assembly 52. The cathode flow field 58 is connected to an oxygen-containing gas inlet connection port 101 and an oxygen-containing gas outlet connection port 102.

An anode flow field (fuel gas flow field) 59 is formed on a surface of the other of the separators 54 facing the membrane electrode assembly 52. The anode flow field 59 is connected to a fuel gas inlet connection port 103 and a fuel gas outlet connection port 104.

The fuel gas (hydrogen) is supplied to the anode 57 to induce electrode reactions by the catalyst. As a result, hydrogen ions are produced from hydrogen molecules. The hydrogen ions permeate the solid polymer electrolyte membrane 55 toward the cathode 56, and electrons are released from the hydrogen molecules.

The electrons released from the hydrogen molecules move from a negative electrode terminal 106 toward the cathode 56 through the voltage converter 42 and the loads such as the motor 46, and through a positive electrode terminal 108.

At the cathode 56, reactions of the hydrogen ions, the electrons, and the oxygen contained in the supplied oxygen-containing gas are induced by operation of the catalyst. As a result, water is produced.

A voltage sensor 110 for detecting the power generation voltage Vfc is provided in a wiring line connecting the positive electrode terminal 108 and the negative electrode terminal 106 and the DC-DC converter 40. Further, a current sensor 112 for detecting the generated power generation current Ifc is provided in a wiring line connecting the positive electrode terminal 108 and the DC-DC converter 40.

The voltage sensor 110 and the current sensor 112 form a power generation state acquisition unit 115 for detecting power generation electric power as the power generation state. The power generation state acquisition unit 115 may be formed only by the current sensor 112.

The compressor 28 comprises a compressor inverter (not shown) to which the battery voltage Vbh of the high voltage energy storage device 44 is applied and a mechanical supercharger, etc. driven by a compressor motor (not shown) controlled by the three phase alternating current output by the compressor inverter.

For example, the compressor 28 has a function of sucking the outside air (atmospheric air, air) from an outside air intake port 113, pressuring the outside air, and supplying the pressurized air to the fuel cell stack 18 through the humidifier 30.

The humidifier 30 includes a channel 31A and a channel 31B. An air (oxygen-containing gas) which has been compressed, heated, and dried by the compressor 28 flows through the channel 31A. An exhaust gas discharged from the oxygen-containing gas outlet connection port 102 of the fuel cell stack 18 through an oxygen-containing off gas outlet 92 flows through the channel 31B.

In this regard, the exhaust gas discharged through the oxygen-containing off gas outlet 92 is a humid oxygen-containing off gas (humid oxygen-containing exhaust gas) when a bleed valve 70 described later is closed. The exhaust gas discharged through the oxygen-containing off gas outlet 92 is a humid exhaust gas produced by mixing the humid oxygen-containing off gas and the fuel off gas when the bleed valve 70 is opened.

The humidifier 30 has a function of humidifying the oxygen-containing gas supplied from the compressor 28. That is, the humidifier 30 moves the water in the exhaust gas (off gas) from the channel 31B to the supply gas (oxygen-containing gas) flowing in the channel 31A through porous membranes in the humidifier 30 for humidification, and supplies the humidified oxygen-containing gas to the fuel cell stack 18 through an oxygen-containing gas inlet 91.

An air flow sensor (AFS: flow rate sensor) 116, the compressor 28, an inlet side stop valve 118, and the humidifier are provided in an oxygen-containing gas supply channel 62 (including oxygen-containing gas supply channels 62A, 62B) from the outside air intake port 113 to the oxygen-containing gas inlet 91. The channels such as the oxygen-containing gas supply channel 62 drawn by double lines are in the form of pipes (channels described later are in the form of pipes as well). The inlet side stop valve 118 opens/closes the oxygen-containing gas supply channel 62.

An oxygen-containing off gas discharge channel 63 connected to the oxygen-containing off gas outlet 92 is provided with the humidifier 30 and an outlet side stop valve 120 which also functions as a back pressure valve in the order from the oxygen-containing off gas outlet 92.

A bypass channel 66 connected to the oxygen-containing gas supply channel 62 and the oxygen-containing off gas discharge channel 63 is provided between the inlet port of the inlet side stop valve 118 and the outlet port of the outlet side stop valve 120. A bypass valve 122 for opening/closing the bypass channel 66 is provided in the bypass channel 66. The bypass valve 122 regulates the flow rate of the oxygen-containing gas bypassing the fuel cell stack 18. A merge channel of the bypass channel 66 and the oxygen-containing off gas discharge channel 63 is connected to a discharge channel 64.

The hydrogen tank 20 has a solenoid-operated hydrogen shutoff valve 21. The hydrogen tank 20 is a container containing high purity hydrogen compressed at high pressure.

The fuel gas discharged from the hydrogen tank 20 flows through the injector 32 and the ejector 34 provided in a fuel gas supply channel 72, and the fuel gas is supplied to the inlet of the anode flow field 59 through a fuel gas inlet 93 and the fuel gas inlet connection port 103 of the fuel cell stack 18.

In this case, the fuel gas supply channel 72 is provided with a pressure sensor 73 for detecting (measuring) the gas pressure Pa (anode pressure) of the fuel gas in the fuel gas supply channel 72.

The outlet of the anode flow field 59 is connected to an inlet 151 of the gas liquid separator 36 through the fuel gas outlet connection port 104, a fuel off gas outlet 94, and a fuel off gas discharge channel 74, and the fuel off gas as the hydrogen-containing gas is supplied from the anode flow field 59 to the gas liquid separator 36.

Further, a case lower end side discharge channel 172 as a case side discharge channel connected to the fuel gas outlet connection port 104 is provided at a lower end (bottom) of a case containing the fuel cell stack 18. The case lower end side discharge channel 172 is connected to a discharge channel 99 through a case side drain valve (discharge valve) 174 as the case lower end side open/close valve.

When the case side drain valve 174 is opened, the liquid water accumulated at the bottom in the case is discharged to the case lower end side discharge channel 172. After completion of the discharge of the liquid water, if the case side drain valve 174 is opened after completion of discharging of the liquid water, the fuel off gas is discharged as in the case of a drain valve (discharge valve) 164 described later.

In practice, part of the water generated by power generation of the fuel cell stack 18 is diffused backward through (permeate) the membrane electrode assembly 52 from the cathode flow field 58, and moves to the anode flow field 59.

In the case where the back-diffused water cannot be discharged suitably from the case lower end side discharge channel 172, the fuel off gas discharge channel 74 or a circulation channel 77, the water enters the anode 57 of the fuel cell stack 18 and blocks the anode flow field (fuel gas flow field) 59, causing deterioration of the power generation stability of the fuel cell stack 18.

In order to prevent the inconvenience, the gas liquid separator 36 for temporally storing water separates the fuel off gas into a gas component and a liquid component (liquid water).

The gas component of the fuel off gas (fuel off gas) is discharged from a gas discharge port 152 of the gas liquid separator 36, and supplied to an intake port of the ejector 34 through the circulation channel 77, and when the bleed valve 70 is opened, the fuel off gas is also supplied to the oxygen-containing gas supply channel 62B through a connection channel (communication channel) 78 and the bleed valve 70.

The liquid component (liquid water) of the fuel off gas comprising back-diffused water flows from the liquid discharge port 160 of the gas liquid separator 36 through a drain channel 162 having the drain valve 164, and the liquid component is mixed with the exhaust gas discharged from the discharge channel 64, and discharged to the outside air through the discharge channel 99 and an exhaust gas discharge port 168.

Some of the fuel off gas (hydrogen containing gas) is discharged into the drain channel 162 together with the liquid water. Further, after discharging of the liquid water is completed, only the fuel off gas (hydrogen-containing gas) is discharged into the drain channel 162.

In order to dilute the hydrogen gas in the fuel off gas, and discharge the diluted hydrogen gas to the outside, some of the oxygen-containing gas discharged from the compressor 28 is supplied to the discharge channel 64 through the bypass channel 66.

After the water is released from the drain channel 162, in the case where the drain valve 164 is kept opened, the hydrogen is discarded wastefully. Therefore, after the water is discharged from the gas liquid separator 36, it is required to suitably close the drain valve 164.

It should be noted that the drain valve 164 is opened during the startup for discharging nitrogen which has permeated the membrane electrode assembly 52 from the cathode flow field 58 in the stoppage time (period where a power switch 71 is in the OFF state) of the fuel cell vehicle 12.

The process of discharging gases such as nitrogen remaining at the anode during the startup to replace the gases with the fuel gas will be referred to as the anode side residual gas replacement process.

The process of diluting, and discharging the fuel gas which has permeated the membrane electrode assembly 52 from the anode flow field 59 in the stoppage time (period where the power switch 71 is in the OFF state) of the fuel cell vehicle 12 to the outside will be referred to as the cathode side residual hydrogen dilution and discharge process.

The bleed valve 70 provided for the connection channel 78 connecting the circulation channel 77 of the fuel off gas and the oxygen-containing gas supply channel 62B is opened during the travel of the fuel cell vehicle 12 for preventing degradation of the anode 57 due to the decrease of the hydrogen concentration in the anode flow field 59 when the nitrogen in the cathode flow field 58 permeates the membrane electrode assembly 52 into the anode flow field 59.

When the bleed valve 70 is opened, the fuel off gas discharged from the fuel cell stack 18 through the fuel off gas discharge channel 74 and the gas liquid separator 36 flows through the connection channel 78, the oxygen-containing gas supply channel 62B, the oxygen-containing gas inlet 91, and the oxygen-containing gas inlet connection port 101, and flows into the cathode flow field 58.

The fuel gas in the fuel off gas flowing through the cathode flow field 58 is ionized into hydrogen ions by the catalyst reaction at the cathode 56, and the hydrogen ions react with the oxygen-containing gas to produce water.

The remaining fuel off gas which has not been consumed in the reaction (nitrogen gas and a small amount of unreacted hydrogen gas) is discharged as the oxygen-containing off gas from the fuel cell stack 18, and flows through the oxygen-containing off gas discharge channel 63.

The oxygen-containing off gas flowing through the oxygen-containing off gas discharge channel 63 (containing the remaining fuel off gas which has not been consumed in the reaction) is mixed with the oxygen-containing gas supplied through the bypass channel 66 of the oxygen-containing gas, and the diluted oxygen-containing off gas having low concentration of the fuel off gas (containing the fuel gas) in the oxygen-containing off gas flows through the discharge channel 64.

The discharge channel 64 is connected to the drain channel 162 and the case lower end side discharge channel 172, and merged into (connected to) the discharge channel 99.

In the discharge channel 99, the oxygen-containing off gas from the discharge channel 64 is used to dilute the fuel gas in the mixed fluid of the liquid water and the fuel off gas discharged from the case lower end side discharge channel 172 and the drain channel 162, and the diluted off gas is discharged to the atmospheric air outside the fuel cell vehicle 12 through the exhaust gas discharge port 168.

The coolant supply apparatus 26 of the fuel cell system 10 has a coolant flow field 138 as a passage of a coolant cla which is a heat medium. The coolant flow field 138 includes a coolant supply channel 140 and a coolant discharge channel 142. The coolant supply channel 140 supplies the coolant to the fuel cell stack 18, and the coolant discharge channel 142 discharges the coolant from the fuel cell stack 18. The coolant supply channel 140 and the coolant discharge channel 142 are connected to the radiator 39.

The radiator 39 cools the coolant. The coolant pump 38 is provided in the coolant supply channel 140. The coolant pump 38 circulates the coolant in the circulation circuit of the coolant. The circulation circuit of the coolant includes the coolant supply channel 140, a coolant flow field in the fuel cell stack 18, the coolant discharge channel 142, and the radiator 39. The coolant discharge channel 142 is provided with a temperature sensor 76. The temperature of the coolant (coolant outlet temperature) Ts detected by the temperature sensor 76 is detected (measured) as the (internal) temperature of the fuel cell stack 18. The above components of the fuel cell system 10 are controlled centrally by the control device 15.

It should be noted that the inlet side stop valve 118, the outlet side stop valve 120, the bleed valve 70, the drain valve 164, and the case side drain valve 174 are flow rate regulator valves of which opening degrees are controlled by the control device 15. Alternatively, open/close solenoid valves may be used as the inlet side stop valve 118, the outlet side stop valve 120, the bleed valve 70, and the drain valve 164, and the case side drain valve 174. In this case, duty control is performed.

The control device 15 comprises an ECU (Electronic Control Unit). The ECU comprises a computer including at least one processor (CPU), a memory, an input/output interface, and an electronic circuit. The at least one processor (CPU) executes computer executable commands or instructions such as programs (not shown) stored in the memory.

The processor (CPU) of the control device 15 controls operation of the fuel cell vehicle 12 and the fuel cell system by performing computation according to the programs, etc.

A power switch (power SW) 71 of the fuel cell vehicle 12 is connected to the control device 15. The power switch 71 starts or continues (ON) or terminates (OFF) the power generation operation of the fuel cell stack 18 of the fuel cell system 10. Further, the control device 15 is also connected to an accelerator pedal sensor (not shown), a vehicle velocity sensor (not shown) and an SOC sensor (not shown) of the energy storage device 44.

[Operation]

The fuel cell system 10 according to the embodiment of the present invention basically has the structure as described above. Hereinafter, with reference to a flow chart in FIG. 2, operation of the fuel cell system 10 will be described.

Figure 2:
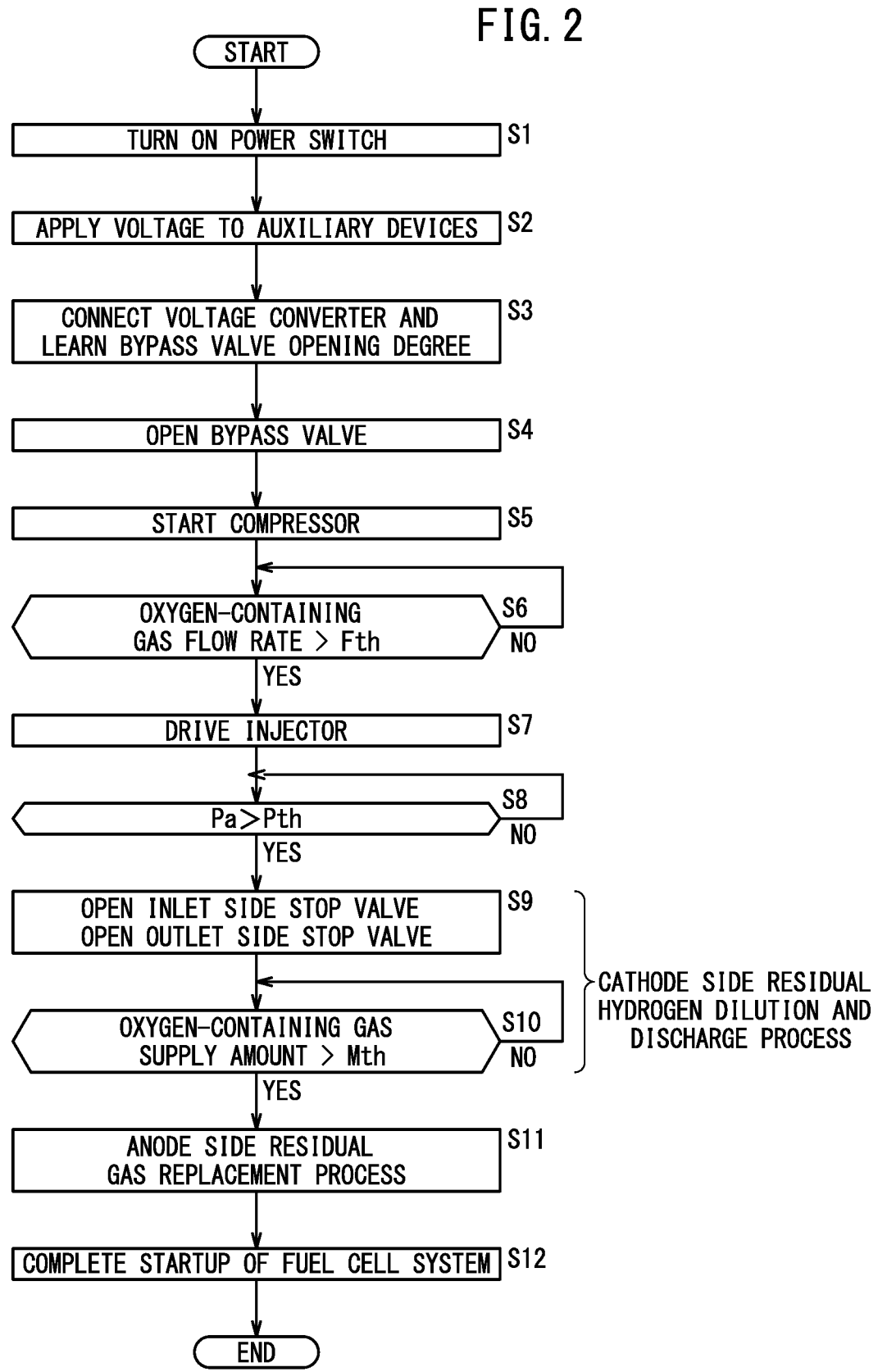
FIG. 2 is a flow chart used for explaining operation of the fuel cell system.

The process of the flow chart in FIG. 2 shows the process of the control device 15 during the startup of the fuel cell system 10 where the power switch 71 is in the ON state.

In step S1, the control device 15 confirms whether the power switch 71 is in the ON state or in the OFF state, and when the power switch 71 is switched from the OFF state to the ON state, the process proceeds to step S2.

It should be noted that in the stop state of the fuel cell vehicle 12 where the power switch 71 is in the OFF state, all of the valves are closed. When the power switch 71 is switched from the OFF state to the ON state, as described below, each of the valves is opened/closed by a predetermined procedure under predetermined conditions.

In step S2, the control device 15 applies voltage to the auxiliary devices, and the process proceeds to step S3. That is, the battery voltage Vbh (high voltage) is applied from the high voltage energy storage device 44 to the compressor 28, and the battery voltage Vbl (low voltage) is applied from the low voltage energy storage device 48 to the coolant pump 38, the injector 32, the voltage converter 42, etc.

In step S3, the control device 15 sets a node between the DC-DC converter 41 and the DC-DC converter 40 at predetermined target voltage (voltage converter connection).

During the setting (connecting) operation, the control device 15 learns the opening degree of the bypass valve 122 between the fully closed position and the fully opened position (applied voltage characteristics) (learns the bypass valve opening degree). When setting (connection) of the voltage converter 42 is confirmed, the control device 15 proceeds the process to step S4.

In step S4, the control device 15 opens the bypass valve 122 at a predetermined opening degree. In this case, the fully opened degree is the predetermined opening degree. Then, the control device 15 proceeds the process to step S5.

In step S5, the control device 15 sets the target rotation number Ntar [rpm] of the compressor 28 to start operation of the compressor 28, and sets the target rotation number of the coolant pump 38 to start operation of the coolant pump 38. Then, the control device 15 proceeds to the process to step S6.

In step S6, the control device 15 determines whether or not the rotation number N of the compressor 28 has increased to a threshold rotation number Nth (the rotation number at which the impeller of the compressor 28 is lifted, and startup is confirmed) below the target rotation number Ntar.

In practice, in step S6, the control device 15 determines whether or not the compressor 28 has rotated to the threshold rotation number Nth by determining whether the oxygen-containing gas flow rate [m³/sec or kg/sec] detected by the flow rate sensor 116 becomes not less than the threshold flow rate Fth, and when the flow rate becomes not less than the threshold Fth (step S6: YES), the process proceeds to step S7.

In step S7, the control device 15 opens a hydrogen shutoff valve 21, and sets the threshold pressure Pth of the anode pressure Pa detected by the pressure sensor 73, drives the injector 32, and starts the supply of the fuel gas to the fuel cell stack 18. At this time, the control device 15 sets the target power generation voltage (idling time target power generation voltage) Vfctar of the fuel cell stack 18.

In step S8, the control device 15 determines whether or not the anode pressure Pa becomes not less than the threshold pressure Pth, and when the anode pressure Pa becomes not less than the threshold pressure Pth, the process proceeds to step S9.

When the determination in step S8 becomes positive, the control device 15 regards that the system is ready for performing the process of diluting and discharging the fuel gas remaining in the cathode flow field 58 and each of the channels (from the cathode flow field 58 to the channels having the inlet side stop valve 118, the outlet side stop valve 120, and the bleed valve 70 that are in the closed state, respectively) (the cathode side residual hydrogen dilution and discharge process). The channels are the oxygen-containing gas supply channel 62B up to the inlet side stop valve 118 and connected to the oxygen-containing gas inlet 91 of the cathode flow field 58, the connection channel 78 up to the bleed valve 70, and the oxygen-containing off gas discharge channel 63 up to the outlet side stop valve 120 and connected to the oxygen-containing off gas outlet 92 of the cathode flow field 58.

In step S9, the control device 15 fully opens the inlet side stop valve 118, from the valve opening degree of "close" to "fully opened", and sets the opening degree of the outlet side stop valve 120 to the 1/n (n is greater than 1 (n>1)) of the valve opening degree of the bypass valve 122, and the process proceeds to step S10.

If the inlet side stop valve 118 is fully opened, the flow rate of the oxygen-containing gas passing through the inlet side stop valve 118 depends on the flow rate (opening degree) of the outlet side stop valve 120 as a back pressure control valve.

The divisor n is determined according to the concentration D [%] of the residual hydrogen remaining at the cathode of the fuel cell stack 18. The fuel gas (hydrogen) is determined by the amount of fuel gas which permeates the membrane electrode assembly 52 from the anode flow field 59 during the stoppage time when the power switch 71 of the fuel cell vehicle 12 is in the OFF state. Therefore, the data of the fuel gas is measured beforehand, and recorded in the storage device of the control device 15.

Figure 3:
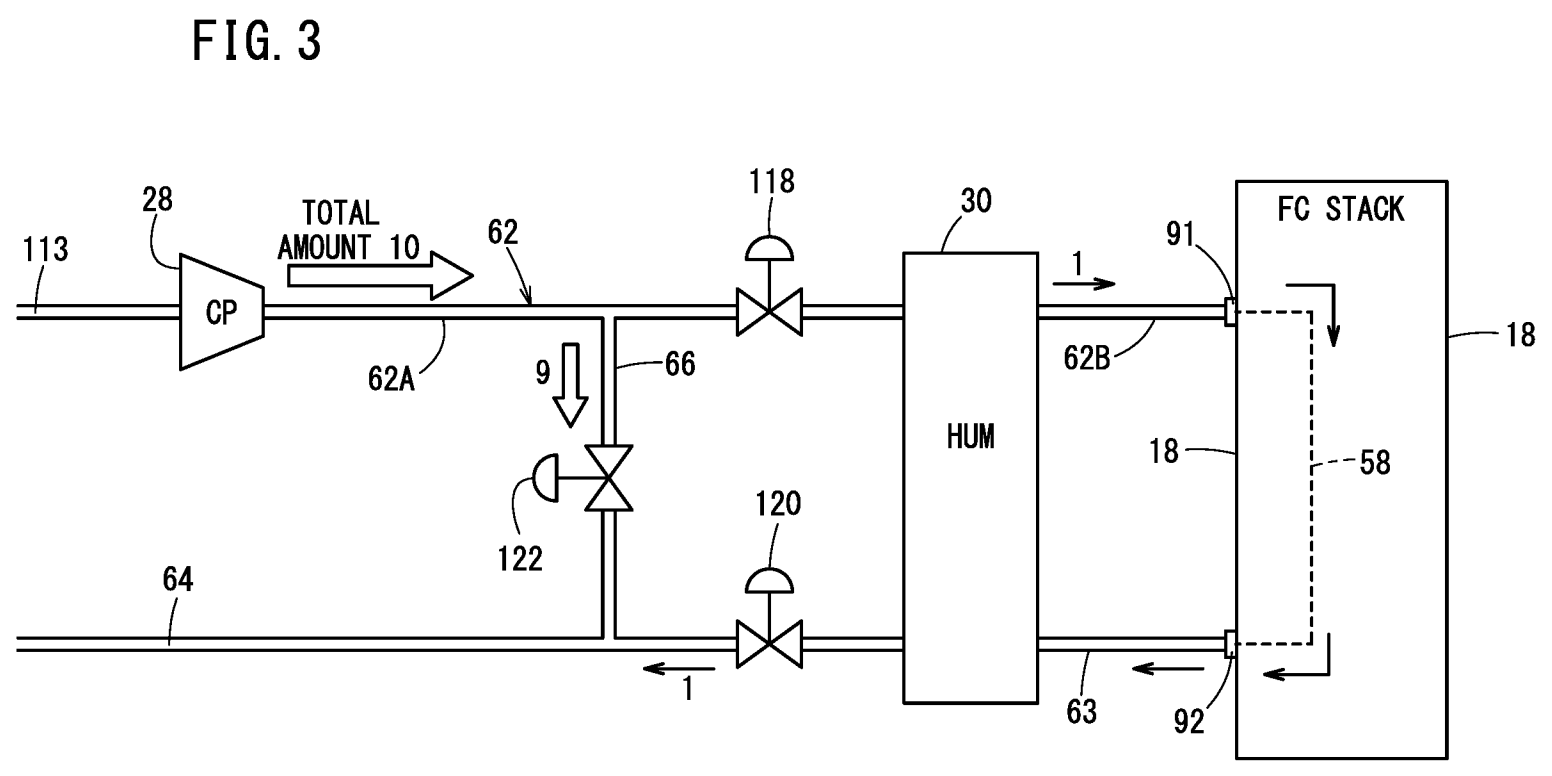

FIG. 3 is a diagram used for explaining a flow rate ratio during concentration dilution and discharge of the fuel gas remaining at the cathode of the fuel cell stack 18 at the time of starting operation. In this case, for example, when n=9, assuming that the oxygen-containing gas is supplied from the compressor 28 at the flow rate of 10/10 (the total amount of the flow rate is denoted by 10/10), 9/10 of the flow rate of the oxygen-containing gas flows through the bypass valve 122, and the remaining 1/10 of the flow rate of the oxygen-containing gas flows through the cathode flow field 58.

Therefore, the concentration of oxygen-containing off gas (exhaust hydrogen concentration) D containing fuel gas of concentration D discharged into discharge channel 64 is diluted to D/(n+1)=D/10 [%].

In step S9, the cathode side residual hydrogen dilution and discharge process of the fuel cell stack 18 is started. In step S9, power generation of the fuel cell stack 18 is started.

In step S10, the control device 15 determines whether or not the supply amount of oxygen-containing gas [m³] has reached a threshold supply amount Mth [m³] since the start of supplying the oxygen-containing gas into the cathode flow field 58 in step S9. Dilution control is considered to be completed if the threshold supply amount Mth [m³] is reached. The unit of the supply amount may be mass instead of volume.

The supply volume [m³] can be calculated as a time integrated value of the oxygen-containing gas flow rate [m³/sec] measured by the flow rate sensor 116 after the time t6 when the inlet side stop valve 118 and outlet side stop valve 120 are opened.

In step S10, the control device 15 sets the opening degree of the bypass valve 122 from the fully opened degree to the predetermined opening degree when the oxygen-containing gas supply amount becomes the threshold supply amount Mth and the determination of dilution control completion becomes positive (step S10: YES). Then, the process proceeds to step S11.

In step S11, the control device 15 opens the case side drain valve 174 and the drain valve 164 to replace the nitrogen, etc. remaining in the anode flow field 59 with the fuel gas. It should be noted that when discharging of the fuel gas from each drain valve is started by opening the case side drain valve 174 and the drain valve 164, the anode pressure Pa is decreased. When the anode pressure Pa is decreased to the predetermined pressure, it is possible to determine that replacement with the fuel gas in the anode flow field 59 has been made. That is, it is determined that anode side residual gas replacement process has been completed.

Next, the process proceeds to step S12. In step S12, when the power generation voltage Vfc becomes the target power generation voltage Vfctar, the control device 15 completes the startup of the fuel cell system 10.

As described above, during startup, the fuel gas (hydrogen) remaining at the cathode of the fuel cell stack 18 can be diluted to be not more than predetermined concentration, and discharged to the outside in a short period of time.

Thereafter, the control device 15 calculates the required power generation electric power to the loads of the fuel cell stack 18 including the motor 46, e.g., based on the accelerator pedal position for controlling the motor 46. Then, the control device 15 performs feedback control of the oxygen-containing gas supply apparatus 22 including the compressor 28 and the fuel gas supply apparatus 24 including the injector 32 in a manner that the power generation electric power of the fuel cell stack 18 becomes equal to the required power generation electric power.

[Description with Reference to Timing Charts]

An example of operation described with reference the flow chart of FIG. 2 will be described with reference to a timing chart of FIG. 4 (overall) and a timing chart of FIG. 5 (part in detail).

Figure 4:
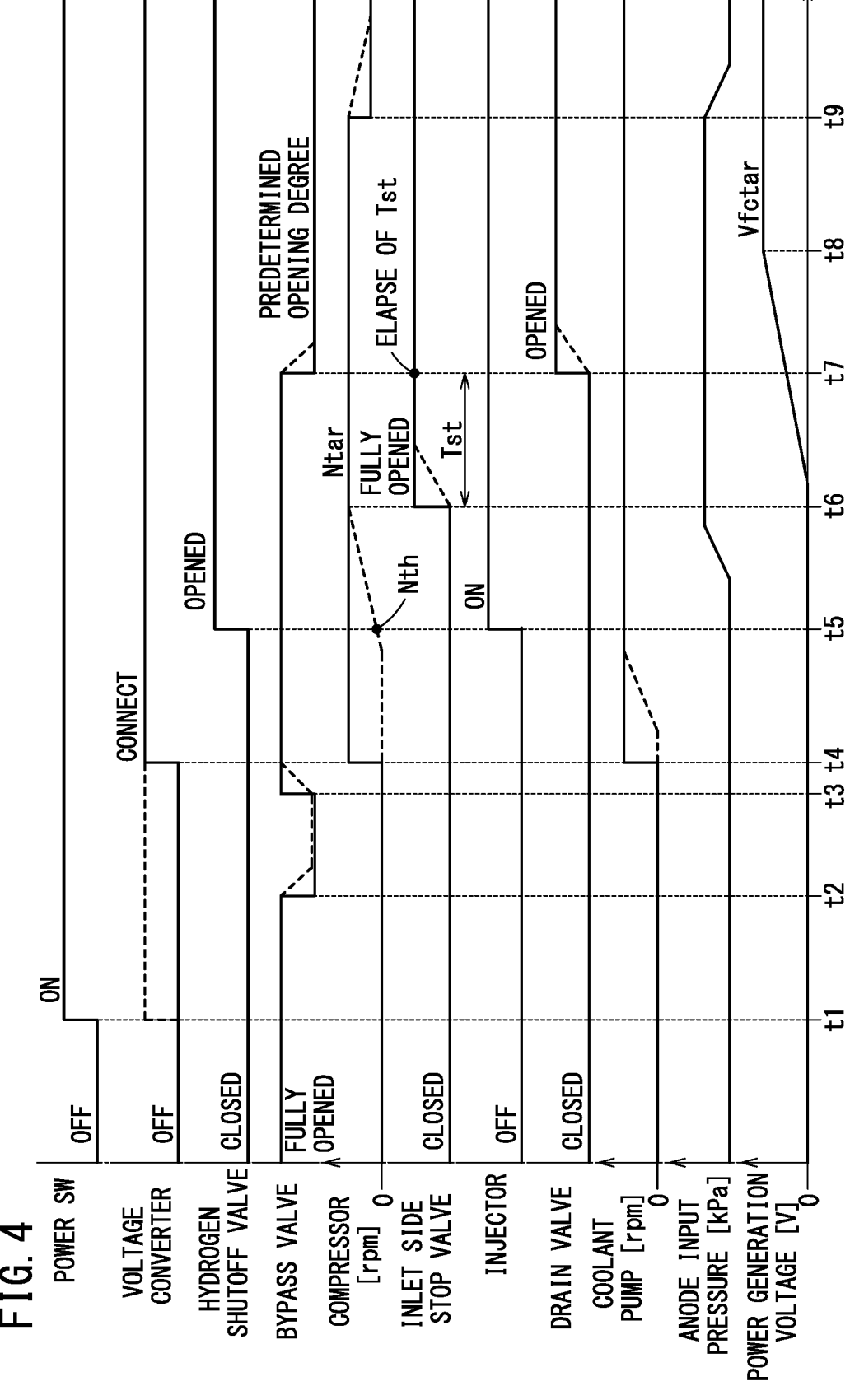
FIG. 4 is a timing chart of the overall startup operation, showing an example of operation described with reference to the flow chart in FIG. 2.

At time t1 of FIG. 4, when the power switch 71 is switched from the OFF state to the ON state, a power supply voltage is applied to the auxiliary devices.

Connection of the voltage converter 42 is completed between time t1 and time t4. In this period, learning of the opening degree of the bypass valve 122 is performed between time t2 and t3.

At time t4, operation of the compressor 28 is started in a manner that the rotation number N of the compressor 28 is controlled toward the target rotation number Ntar. Likewise, operation of the coolant pump 38 is started toward the target rotation number.

In the timing chart of FIG. 4, for example, for the compressor 28, a solid line shows the command value (target rotation number Ntar, etc.) and a sloping broken line shows the actual operation (actual rotation number of the motor for the compressor which rotates an impeller).

At time t5, when the oxygen-containing gas flow rate measured by the flow rate sensor 116 reaches the threshold flow rate Fth and startup of the compressor 28 (lifting of the impeller) is confirmed, the hydrogen shutoff valve 21 is opened. At the same time, the injector 32 is placed in the operating state (ON state), the fuel gas is supplied to the fuel cell stack 18, and the fuel gas begins to flow in the anode flow field 59.

In the operating state (ON state), the injector 32 is controlled by pulse width modulation, and the ON duty {injection time/(injection time+non-injection time) is controlled. The denominator herein (injection time+non-injection time) is a fixed time.

At time t6, when the anode pressure Pa exceeds the threshold pressure Pth, the cathode side residual hydrogen dilution and discharge process, which is a gas replacement process for the cathode flow field 58, etc., is started.

Therefore, at time t6, the opening degree of the inlet side stop valve 118 is set to 1/n to "fully opened" (n=1 means that the valve is fully opened) and the opening degree of the outlet side stop valve 120 is set to 1/n (⅕ herein) (see FIG. 3 above).

In this state, the control device 15 continues the dilution control until the amount of the oxygen-containing gas supplied into the cathode flow field 58 from the time of starting supply of the oxygen-containing gas reaches the threshold supply amount Mth where the dilution control is considered to be completed.

In this embodiment, the control device 15 stores the supply time until reaching the threshold supply amount Mth as specified time Tst in a memory. The threshold supply amount Mth has been measured in beforehand. The control device 15 determines that the supply of the threshold supply amount Mth is completed at time t7, when the specified time Tst has elapsed from time t6 when the inlet side stop valve 118 is set from the closed state to the fully open state. At time t7, the bypass valve 122 is set from the fully opened state to the predetermined open degree state.

At time t7, the power generation by the fuel cell stack 18 continues, and the power generation voltage Vfc is increased toward the target power generation voltage Vfctar.

At time t7 when the predetermined time Tst elapses, the case side drain valve 174 and the drain valve 164 are opened. After elapse of a predetermined period of time in the state where the case side drain valve 174 and the drain valve 164 are opened, the nitrogen remaining in the anode flow field 59 is discharged to the outside and replaced with the fuel gas.

At time t8 when the power generation voltage Vfc is increased to the target power generation voltage Vfctar, the anode side residual gas replacement process is completed.

From time t9, the control device 15 starts normal power generation control of the fuel cell stack 18 to meet the power generation requirements of the loads.

Figure 5:
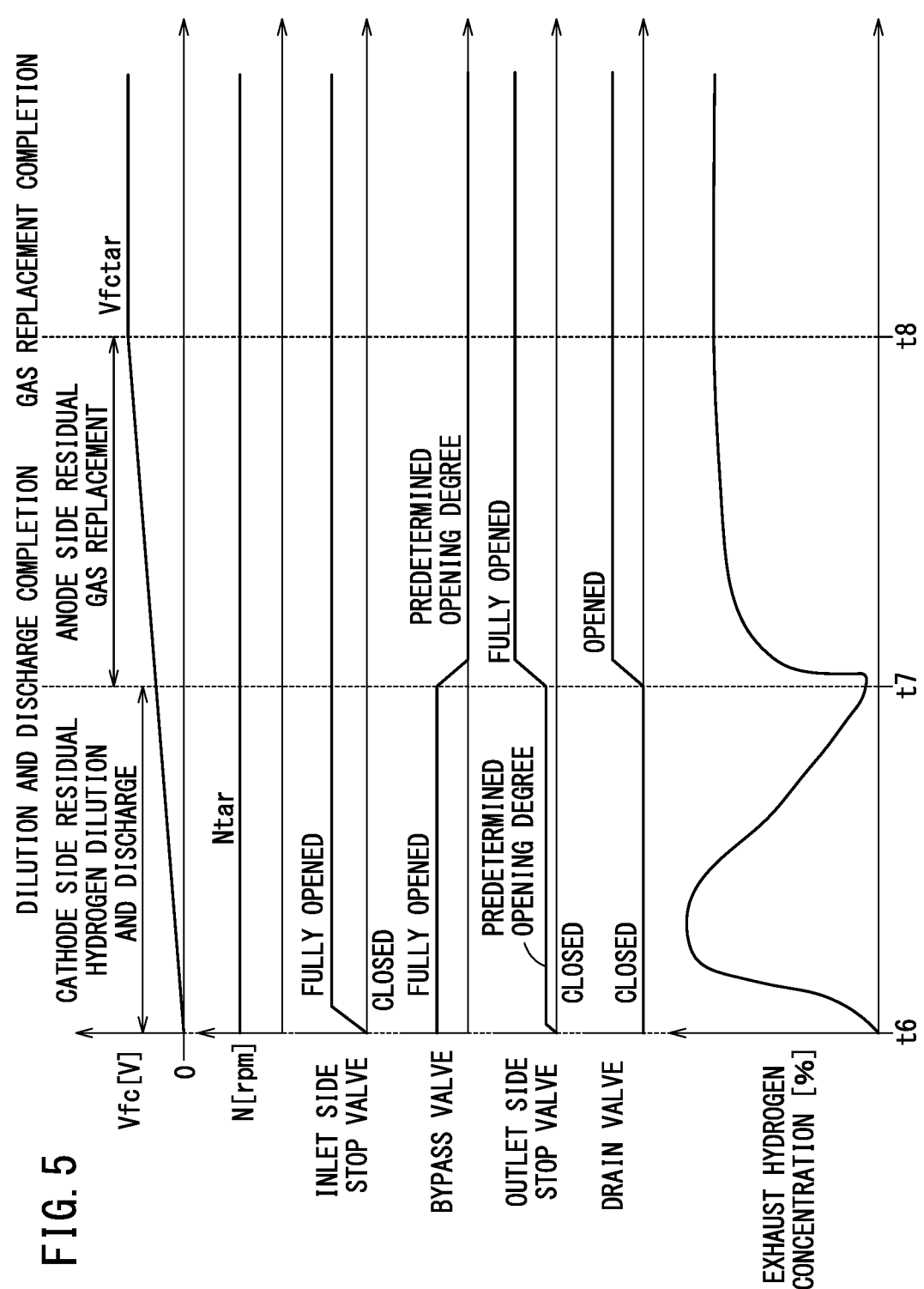
FIG. 5 is a timing chart showing the transition state of exhaust hydrogen concentration, etc. during a residual hydrogen dilution and discharge period at the cathode and during a residual gas replacement period at an anode, in FIG. 4.

FIG. 5 is an enlarged timing chart between time t6 and time t8 in FIG. 4. The time transition waveform of exhaust hydrogen concentration [%] is shown at the bottom.

In the state where the bypass valve 122 is fully opened, the inlet side stop valve 118 is opened to the fully opened state, and the at time t6 where the outlet side stop valve 120 is opened at the predetermined opening degree, dilution of the hydrogen remaining in the cathode flow field 58 is started. Stated otherwise, in the state where the inlet side stop valve 118 is fully opened, the outlet side stop valve 120 is opened. As a result, while the hydrogen remaining in the cathode flow field 58 and the channels connected to the cathode flow field 58 is diluted, the hydrogen is discharged to the outside.

Immediately after time t6, the exhaust hydrogen concentration increases sharply, and then, gradually decreases after elapse of a certain period of time in the state where the exhaust hydrogen concentration diluted to 1/n has a substantially constant concentration.

At time t7, when the cathode side residual hydrogen dilution and discharge process is completed, the bypass valve 122 is set to the predetermined opening degree and the outlet side stop valve 120 is fully opened. As a result, the power generation voltage Vfc continues to increase.

At time t7, since the drain valve 164 is opened, discharging of the nitrogen remaining in the anode flow field 59 is started, and at time t8, the anode side residual gas replacement process (anode gas replacement process) is completed.

Modified Embodiment

The above embodiment may be modified as follows. In order to reduce the startup time of the fuel cell system 10, the process may be switched to the anode side residual gas replacement process before the hydrogen remaining in the cathode flow field 58 is completely discharged. In this modified embodiment, the hardware configuration of the fuel cell system 10 and fuel cell vehicle 12 is identical to the hardware configuration of the embodiment shown in FIG. 1.

Figure 6:
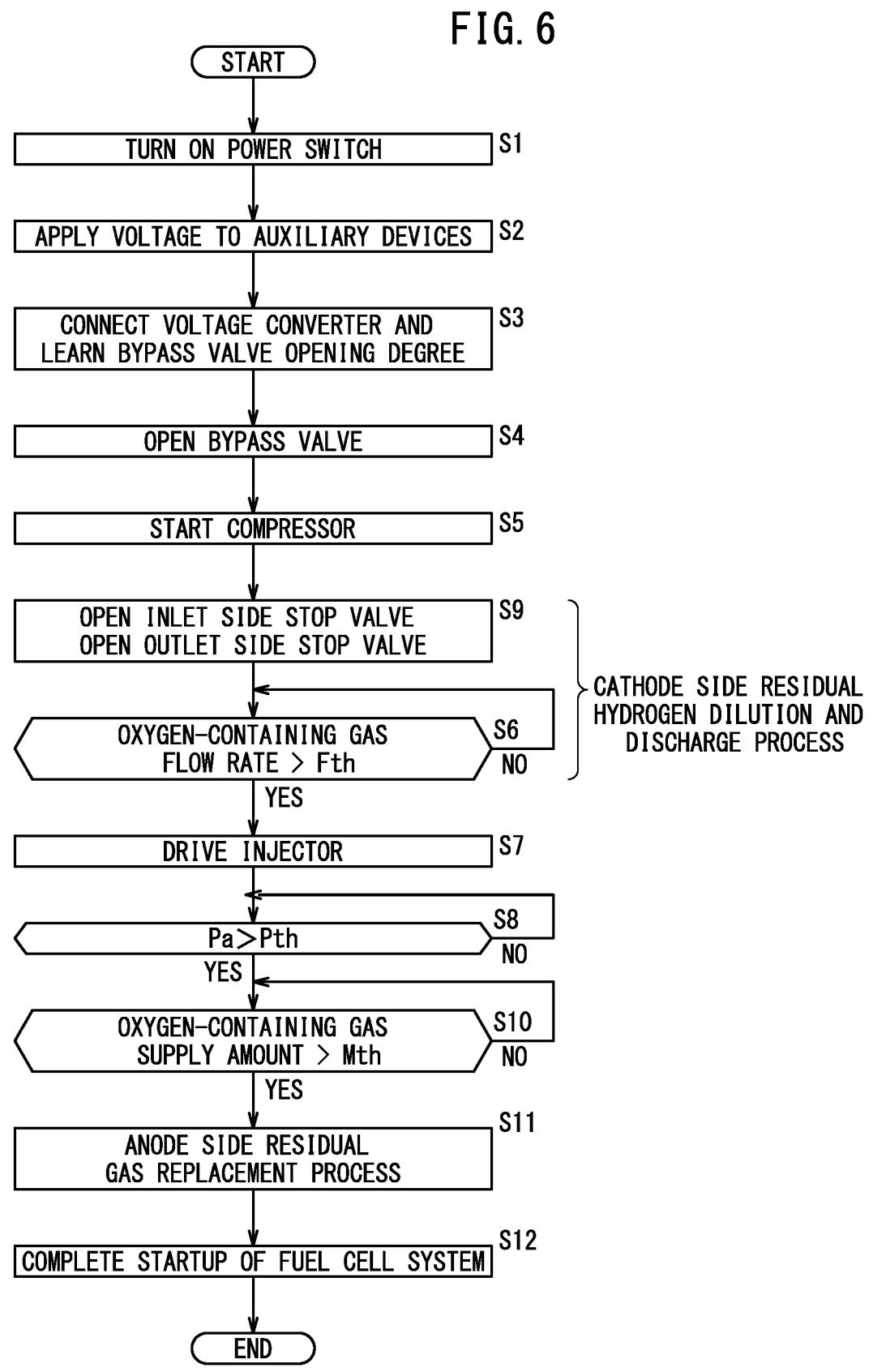
FIG. 6 is a flow chart used for explaining operation of a fuel cell system according to a modified embodiment.

FIG. 6 is a flow chart used to explain the operation of the fuel cell system 10 according to the modified embodiment. In FIG. 6, the same processes as in FIG. 2 are labelled with the same step numbers, and only the differences will be explained. The processes from step S1 to step S4 are identical to the processes in FIG. 2.

In step S5, the control device 15 starts the compressor 28 while setting the target rotation number Ntar thereof, and also starts the coolant pump 38 while setting the target rotation number thereof, and then, performs the process of step S9 before the process of step S6. That is, before the compressor 28 reaches the target rotation number Ntar, at the same time that operation of the compressor 28 is started (at time t4 in FIG. 4), in step S9, the control device 15 fully opens the inlet side stop valve 118, sets the valve opening degree of the outlet side stop valve 120 to 1/n of the valve opening degree of the bypass valve 122, and proceeds to step S6.

In step S6, the control device 15 determines whether or not the oxygen-containing gas flow rate [m$^3$/sec or kg/sec] detected by the flow rate sensor 116 becomes not less than the threshold flow rate Fth, and when the oxygen-containing gas flow rate becomes not less than the threshold flow rate Fth (step S6: YES), the process proceeds to step S7.

Thereafter, after the processes in steps S7 and S8 are performed, the process proceeds to step S10. In step S10, the control device 15 determines whether or not the supply amount of the oxygen-containing gas [m$^3$] has reached the threshold supply amount Mth [m$^3$] since the start of supplying the oxygen-containing gas into the cathode flow field 58 in step S9. The dilution control is considered to be completed if the threshold supply amount Mth [m$^3$] is reached.

The modified embodiment will be described with reference to a timing chart in FIG. 4. The time at which the inlet side stop valve 118 and the outlet side stop valve 120 are opened is changed from time t6 to time t4. Therefore, the supply flow rate during the period from the time when the compressor 28 starts up (slightly before time t5) to time t6 indicated by a rising broken line can be achieved at an early timing. Accordingly, it is possible to set the completion determination time t7 for cathode side residual hydrogen dilution and discharge process earlier than the above described embodiment.

Therefore, the control device 15 can start the process from step S11 at an early timing. As a result, it is possible to reduce the startup time of the fuel cell system 10.

INVENTION UNDERSTOOD FROM THE EMBODIMENTS

Hereinafter, the invention understood from the above embodiments will be described. For ease of understanding, some of constituent elements are labelled with reference numerals used in the above embodiments. However, the present invention is not limited to the particular labelled constituent elements.

(1) The fuel cell system 10 according to the present invention includes the fuel cell stack 18 configured to perform power generation by a fuel gas and an oxygen-containing gas, the oxygen-containing gas supply apparatus 22 configured to supply the oxygen-containing gas to the fuel cell stack through the oxygen-containing gas supply channel 62, the oxygen-containing off gas discharge channel 63 configured to discharge an oxygen-containing off gas used in the power generation from the fuel cell stack, the bypass channel 66 configured to connect the oxygen-containing gas supply channel and the oxygen-containing off gas discharge channel, the inlet side stop valve 118 configured to adjust the flow rate in the oxygen-containing gas supply channel, the outlet side stop valve 120 configured to adjust the flow rate in the oxygen-containing off gas discharge channel, the bypass valve 122 configured to adjust the flow rate in the bypass channel, and the control device 15 configured to adjust opening degrees of the inlet side stop valve, the outlet side stop valve, and the bypass valve. During startup of the fuel cell system, the control device is configured to adjust opening degrees of the bypass valve, the inlet side stop valve, and the outlet side stop valve in a manner that the flow rate of the oxygen-containing gas in the bypass channel supplied from the oxygen-containing gas supply apparatus becomes larger than the flow rate in the oxygen-containing gas supply channel and the flow rate in the oxygen-containing off gas discharge channel.

In the structure, during startup of the fuel cell system, the opening degrees of the bypass valve, the inlet side stop valve, and the outlet side stop valve are adjusted in a manner that the flow rate of the oxygen-containing gas in the bypass channel becomes larger than the flow rate in the oxygen-containing gas supply channel and the oxygen-containing off gas discharge channel. Therefore, during the startup of the fuel cell system, while diluting concentration of the fuel gas remaining at the cathode of the fuel cell stack, it is possible to discharge the fuel gas to the outside in a short period of time.

(2) Further, in the fuel cell system, during startup of the fuel cell system, the control device may be configured to adjust the opening degrees of the bypass valve and the inlet side stop valve to predetermined opening degrees, and adjust the opening degree of the outlet side stop valve in the opening direction from the fully closed state to the predetermined opening degree state.

In this manner, with the simple opening degree control concerning the three valves, since it is possible to adjust the flow rate in the bypass channel to become larger than the flow rate in the oxygen-containing gas supply channel and the oxygen-containing off gas discharge channel, improvement in the efficiency is achieved.

(3) Further, in the fuel cell system, the control device may be configured to adjust each of the opening degrees of the bypass valve and the inlet side stop valve to the fully opened degree.

In this manner, with the simple opening degree control concerning the three valves, it is possible to adjust the flow rate in the bypass channel to become larger than the flow rate in the oxygen-containing gas supply channel and the oxygen-containing off gas discharge channel.

That is, adjustment of the valve opening degree to predetermined opening degrees excluding the fully closed and fully opened degrees can be made only by adjusting the outlet side stop valve. Therefore, improvement in the efficiency is achieved. Further, since the flow rate in the bypass valve for diluting the hydrogen can be increased, it is possible to reduce the hydrogen discharge time while maintaining the predetermined discharge concentration.

(4) Moreover, the fuel cell system may further include the fuel gas supply apparatus 24 configured to supply the fuel gas to the fuel cell stack through the fuel gas supply channel 72, the fuel off gas discharge channel 74 configured to discharge a fuel off gas used for power generation from the fuel cell stack, and the discharge valve 174 provided in the fuel gas supply channel or the fuel off gas discharge channel, and configured to discharge a gas remaining in the fuel gas supply channel, the fuel off gas discharge channel, and the anode flow field 59 in the fuel cell stack. The control device may be configured to, during startup of the fuel cell system, after starting supply of the oxygen-containing gas from the oxygen-containing gas supply apparatus, supply the fuel gas from the fuel gas supply apparatus, and thereafter, adjust the opening degrees of the bypass valve, the inlet side stop valve, and the outlet side stop valve, and in this state, when a supply amount or supply time of the oxygen-containing gas after starting the supply of the oxygen-containing gas becomes not less than a threshold value, open the discharge valve.

In the structure, during the startup of the fuel cell system, while diluting the concentration of the fuel gas remaining at the cathode of the fuel cell stack, the fuel gas is discharged to the outside, and thereafter, the discharge valve for discharging the gas remaining at the anode flow field in the fuel cell stack is opened. Therefore, it is possible to smoothly replace the nitrogen gas remaining at the anode of the fuel cell stack with the fuel gas.

(5) Moreover, in the fuel cell system, during startup of the fuel cell system, before the flow rate of the oxygen-containing gas supplied from the oxygen-containing gas supply apparatus becomes a target flow rate, the control device may be configured to adjust the opening degrees of the bypass valve, the inlet side stop valve, and the outlet side stop valve.

In the present invention, during the startup, before the flow rate of the oxygen-containing gas supplied from the oxygen-containing gas supply apparatus becomes the target flow rate, the bypass valve, the inlet side stop valve, and the outlet side stop valve are adjusted to opening degrees suitable for concentration dilution of the fuel gas remaining at the cathode of the fuel cell stack beforehand. In the structure, during the startup, it is possible to reduce the dilution time of the concentration of the fuel gas remaining at the cathode of the fuel cell stack.

The present invention is not limited to the above disclosure, and various modifications are possible without departing from the essence and gist of the present invention.

The invention claimed is:

1. A fuel cell system comprising:
a fuel cell stack configured to perform power generation by a fuel gas and an oxygen-containing gas;
an oxygen-containing gas supply apparatus configured to supply the oxygen-containing gas to the fuel cell stack through an oxygen-containing gas supply channel;
an oxygen-containing off gas discharge channel configured to discharge an oxygen-containing off gas used in the power generation from the fuel cell stack;
a bypass channel configured to connect the oxygen-containing gas supply channel and the oxygen-containing off gas discharge channel;
an inlet side stop valve configured to adjust a flow rate in the oxygen-containing gas supply channel;
an outlet side stop valve configured to adjust a flow rate in the oxygen-containing off gas discharge channel;
a bypass valve configured to adjust a flow rate in the bypass channel; and
one or more processors configured to execute computer-executable instructions stored in a memory,
wherein, during startup of the fuel cell system, the one or more processors execute the computer-executable instructions to cause the fuel cell system to adjust opening degrees of the bypass valve, the inlet side stop valve, and the outlet side stop valve in a manner that the flow rate of the oxygen-containing gas in the bypass channel supplied from the oxygen-containing gas supply apparatus becomes larger than the flow rate in the oxygen-containing gas supply channel and the flow rate in the oxygen-containing off gas discharge channel.

2. The fuel cell system according to claim 1, wherein, during startup of the fuel cell system, the one or more processors execute the computer-executable instructions to cause the fuel cell system to adjust the opening degrees of the bypass valve and the inlet side stop valve to predetermined opening degrees, and adjust the opening degree of the outlet side stop valve in an opening direction from a fully closed state to a predetermined opening degree state.

3. The fuel cell system according to claim 2, wherein, the one or more processors execute the computer-executable instructions to cause the fuel cell system to adjust each of the opening degrees of the bypass valve and the inlet side stop valve to a fully opened degree.

4. The fuel cell system according to claim 1, further comprising:
a fuel gas supply apparatus configured to supply the fuel gas to the fuel cell stack through a fuel gas supply channel;
a fuel off gas discharge channel configured to discharge a fuel off gas used for the power generation from the fuel cell stack; and
a discharge valve provided in the fuel gas supply channel or the fuel off gas discharge channel, and configured to discharge a gas remaining in the fuel gas supply channel, the fuel off gas discharge channel, and an anode flow field in the fuel cell stack,
wherein, during startup of the fuel cell system, the one or more processors execute the computer-executable instructions to cause the fuel cell system to, after starting supply of the oxygen-containing gas from the oxygen-containing gas supply apparatus, supply the fuel gas from the fuel gas supply apparatus, and thereafter, adjust the opening degrees of the bypass valve, the inlet side stop valve, and the outlet side stop valve, and in this state, when a supply amount or supply time of the oxygen-containing gas after starting the supply of the oxygen-containing gas becomes not less than a threshold value, open the discharge valve.

5. The fuel cell system according to claim 1, wherein, during startup of the fuel cell system, before the flow rate of the oxygen-containing gas supplied from the oxygen-containing gas supply apparatus becomes a target flow rate, the one or more processors execute the computer-executable instructions to cause the fuel cell system to adjust the opening degrees of the bypass valve, the inlet side stop valve, and the outlet side stop valve.

6. The fuel cell system according to claim 5, wherein, during startup of the fuel cell system, the one or more processors execute the computer-executable instructions to cause the fuel cell system to adjust the opening degrees of the bypass valve and the inlet side stop valve to predetermined opening degrees, and adjust the opening degree of the outlet side stop valve in an opening direction from a fully closed state to a predetermined opening degree state.

7. The fuel cell system according to claim 6, wherein, the one or more processors execute the computer-executable instructions to cause the fuel cell system to adjust each of the opening degrees of the bypass valve and the inlet side stop valve to a fully opened degree.

8. The fuel cell system according to claim 5, further comprising:
a fuel gas supply apparatus configured to supply the fuel gas to the fuel cell stack through a fuel gas supply channel;
a fuel off gas discharge channel configured to discharge a fuel off gas used for the power generation from the fuel cell stack; and
a discharge valve provided in the fuel gas supply channel or the fuel off gas discharge channel, and configured to discharge a gas remaining in the fuel gas supply channel, the fuel off gas discharge channel, and an anode flow field in the fuel cell stack,
wherein, during startup of the fuel cell system, the one or more processors execute the computer-executable instructions to cause the fuel cell system to, after starting supply of the oxygen-containing gas from the oxygen-containing gas supply apparatus, supply the fuel gas from the fuel gas supply apparatus, and thereafter, adjust the opening degrees of the bypass valve, the inlet side stop valve, and the outlet side stop valve, and in this state, when a supply amount or supply time of the oxygen-containing gas after starting the supply of the oxygen-containing gas becomes not less than a threshold value, open the discharge valve.

\* \* \* \* \*